(12) United States Patent
Wang et al.

(10) Patent No.: US 8,059,535 B2
(45) Date of Patent: Nov. 15, 2011

(54) METHOD AND CORE ROUTER FOR DELAYING BURST

(75) Inventors: Sheng Wang, Chengdu (CN); Yulei Qi, Chengdu (CN); Du Xu, Chengdu (CN); Shizhong Xu, Chengdu (CN); Yi Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 274 days.

(21) Appl. No.: 12/469,286

(22) Filed: May 20, 2009

(65) Prior Publication Data

US 2009/0245269 A1   Oct. 1, 2009

Related U.S. Application Data

(63) Continuation of application No. PCT/CN2007/003094, filed on Oct. 30, 2007.

(30) Foreign Application Priority Data

Jan. 26, 2007   (CN) .......................... 2007 1 0007501

(51) Int. Cl.
*G01R 31/08* (2006.01)
(52) U.S. Cl. ........................... 370/230; 370/238; 398/53
(58) Field of Classification Search .................. 370/229, 370/230, 230.1, 235, 238, 360, 389; 398/45, 398/47–49, 51, 53, 54, 57
See application file for complete search history.

(56) References Cited

U.S. PATENT DOCUMENTS

| 6,804,255 | B1 * | 10/2004 | Zheng et al. ................. 370/468 |
| 7,257,127 | B1 * | 8/2007 | Cankaya ...................... 370/459 |
| 2002/0054732 | A1 * | 5/2002 | Zheng ............................ 385/24 |
| 2002/0118420 | A1 * | 8/2002 | Liu ................................ 359/139 |
| 2002/0118421 | A1 * | 8/2002 | Xiong et al. .................. 359/140 |
| 2004/0052213 | A1 * | 3/2004 | Cankaya et al. .............. 370/235 |
| 2004/0063461 | A1 | 4/2004 | Li et al. |

(Continued)

FOREIGN PATENT DOCUMENTS

CN   1516412 A   7/2004

(Continued)

OTHER PUBLICATIONS

Chinese Office Action dated Oct. 23, 2009, issued in related Chinese Application No. 200710007501.2, with English Translation.

(Continued)

*Primary Examiner* — Jung Park
(74) *Attorney, Agent, or Firm* — Finnegan, Henderson, Farabow, Garrett & Dunner LLP

(57) ABSTRACT

A method and a core router for implementing forward delay for bursts are disclosed. The core router configured with an FDL performs proactive delay processing for the burst to be overlapped after predicting that the burst will be overlapped on the link to be protected, thus reducing the probability of burst conflict on the downstream link to be protected. After finding that burst conflict will occur on the output port of the core router at a future moment, the core router sends a burst delay request to the upstream core router, requesting the upstream core router that has an FDL and the delay capability to delay the burst. Therefore, the FDL configured in the network is brought into full play, and the probability of burst conflict is reduced.

10 Claims, 6 Drawing Sheets

U.S. PATENT DOCUMENTS

2005/0152351 A1* 7/2005 Wang et al. ................. 370/387
2007/0171900 A1* 7/2007 Beshai et al. ................ 370/380

FOREIGN PATENT DOCUMENTS

| CN | 1601995 A | 3/2005 |
|---|---|---|
| CN | 1625150 A | 6/2005 |
| CN | 1852617 A | 10/2006 |
| EP | 1 439 730 A1 | 7/2004 |

OTHER PUBLICATIONS

Communication enclosing a Supplemental European Search Report for EP Application No. 07816707.9, mailed Oct. 16, 2009 (8 pages).

International Search Report from P.R. China in International Application No. PCT/CN2007/003094 mailed Feb. 14, 2008.

Chunming Qiao et al. "Optical Burst Switching (OBS)—A New Paradigm for an Optical Internet", Lab for Advanced Network Design, Evaluation and Research (LANDER) University at Buffalo. This research is sponsored in part by a grant from NSF under contract No. ANIR-9801778, (24 pages).

Jikai Li et al. "Schedule Burst Proactively for Optical Burst Switching Networks", Department of Computer Science and Engineering, State University of New York at Buffalo. Globecom 2003 IEEE, pp. 2787-2791 (5 pages).

Zygmunt Haas, The "Staggering Switch": An Electronically Controlled Optical Packet Switch, IEEE Journal of Lightwave Technology, vol. 11, No. 5/6, May/Jun. 1993, pp. 925-936 (12 pages).

Imrich Chlamtac et al, "CORD: Contention Resolution by Delay Lines", IEEE Journal on Selected Areas in Communications, vol. 14. No. 5, Jun. 1996, pp. 1014-1029 (16 pages).

* cited by examiner (a)

(b)

METHOD AND CORE ROUTER FOR DELAYING BURST

This application is a continuation of International Patent Application No. PCT/CN2007/003094 filed on Oct. 30, 2007, which claims priority to Chinese Patent Application No. 200710007501.2, filed with the Chinese Patent Office on Jan. 26, 2007, both of which are incorporated herein by reference in their entireties.

FIELD OF THE INVENTION

The present disclosure relates to optical communication technologies, and in particular, to a method and a core router for implementing forward delay of burst.

BACKGROUND

FIG. 1 shows a structure of an Optical Burst Switching (OBS) network, where the OBS network is composed of an edge router and a core router. The edge router is adapted to encapsulate input IP packets into a burst, and schedule the generated burst onto an output wavelength. The core router is adapted to switch the corresponding optical burst from an input port to a proper output port according to the information carried in a Burst Header Packet (BHP). Moreover, the core router is also adapted to handle contention between optical bursts in order to accomplish high switching throughput. The core router receives the BHPs which arrive first before forwarding the optical burst. The information carried in the BHP decides the features of the optical burst from the port, for example, arrival time, duration (burst length), port and wavelength information, priority, and so on. The core router processes the BHPs that come from all ports, and determines the configuration state of the optical switching array dynamically in time, so as to send as many burst packets as possible to the expected output port.

The features of the optical burst switching network decide if optical bursts contention exists. When multiple optical bursts contend for the same wavelength of the same output port at the same time, conflict occurs. Contention between optical bursts leads to network congestion and massive data loss. The practicability of the optical burst switching technology depends on the solution to avoiding or reducing the data loss caused by burst contention in the network.

In a traditional electrical switching network, the solution to conflict depends on the electronic buffer. In an optical domain, however, the precisely-termed random storage mechanism does not exist. Currently, the buffer in the optical domain depends on a Fiber Delay Line (FDL). In the prior art, an FDL may be configured on the core router to reduce burst conflicts. Because the signal quality and physical space are limited, the size of the FDL buffer is limited. Moreover, the FDL introduces power loss. If an optical signal amplifier is used to compensate for the power, noise is increased. If optical signals are regenerated, the cost is too high.

In the case that the FDL is lacking or unavailable in the core router, packet loss occurs if the quantity of simultaneously transmitted optical bursts exceeds the quantity of available wavelength channels. In the prior art, a Burst Overlap Reduction Algorithm (BORA) is used to reduce loss of bursts. The principles of the BORA are: The burst into the OBS network is delayed to some extent through an electrical buffer on the edge router to minimize the overlap of bursts and reduce the probability of conflict on the downstream core router. FIG. 2 shows how to delay a burst through the BORA in the prior art, where (a) shows the burst transmission not based on the BORA and (b) shows the burst transmission based on the BORA. In FIG. 2, each core router has two input paths "X" and "Y" and one output path "Z", and each path has one control channel and two data channels. As shown in (a), if no BORA is applied, four bursts in four data channels of the time (t1, t2) input path are overlapped, with the overlap being 4. As shown in (b), after the BORA is applied, the burst is delayed to some extent, thus reducing the overlap. However, the primary function of the BORA is to apply the scheduling technology to the edge router, without bringing the core router into full play.

SUMMARY

The present disclosure provides a method for delaying a burst and a core router applying this method. By utilizing the FDL configured in the network efficiently, the probability of burst conflicts is reduced.

A method for delaying a burst according to an embodiment of the present disclosure includes:

determining, by the core router, a burst that needs to be delayed, and specifying a proper delay length for the burst to be delayed, if a Burst Header Packet (BHP) received by a core router indicates that bursts directed to a link to be protected will be overlapped on the link;

reserving a proper resource for the burst to be delayed and generating a proper BHP according to the received BHP and the delay length, and sending the generated BHP to the downstream core router; and scheduling the burst to be delayed into the reserved resource after receiving the burst, and sending the burst to the downstream core router.

A core router according to an embodiment of the present disclosure includes:

a BHP receiving module adapted to receive a BHP;

a delay control module adapted to: determine the burst that needs to be delayed according to the received BHP if the BHP received by the BHP receiving module indicates that bursts will be overlapped on the link to be protected, specify a proper delay length for a burst to be delayed, reserve a proper resource for the burst to be delayed, and generate a proper BHP; and a BHP sending module adapted to send the BHP generated by the delay control module to the downstream core router.

Another method for delaying a burst according to an embodiment of the present disclosure includes:

determining, by a core router, the burst that needs to be delayed and the proper delay length after receiving a BHP which indicates that the corresponding bursts will conflict on the output port of the core router;

sending a delay request packet to an upstream core router according to the delay length, if the core router is able to send the delay request packet to the upstream core router; and releasing, by the core router that receives the delay request packet, the resource previously reserved for the burst if the burst can be delayed according to the delay request packet, reserving a new resource for the burst, and generating a new BHP and sending the new BHP to the downstream core router.

Another core router according to an embodiment of the present disclosure includes:

a BHP receiving module adapted to receive a BHP;

a burst receiving module adapted to receive a burst;

a delay request sending module adapted to send a delay request packet to the upstream core router; and a judging module adapted to: judge whether it is necessary to send the delay request packet to the upstream core router if the BHP received by the BHP receiving module indicates that the corresponding bursts will conflict on the output port; and if it is necessary to send the delay request packet to the upstream core route, trigger the delay request sending module to send the delay request packet to the upstream core router, or else control the burst receiving module to discard the burst upon receiving the burst.

Another core router according to an embodiment of the present disclosure includes:

a BHP sending module adapted to send a BHP;

a delay request receiving module adapted to receive a delay request packet from the downstream core router;

a resource reserving module adapted to reserve a proper resource for the burst; and a judging module adapted to: judge whether the burst can be delayed according to the delay request packet received by the delay request receiving module; if the burst can be delayed according to the delay request packet received by the delay request receiving module, release the resource previously reserved for the burst, trigger the resource reserving module to reserve a new resource for the burst, and generate a new BHP which is sent by the BHP sending module to the downstream core router; otherwise, release the resource previously reserved for the burst.

In the embodiments of the present disclosure, the core router with an FDL performs proactive delay processing for the burst to be overlapped after predicting that the burst will be overlapped on the link to be protected, thus reducing the probability of burst overlap on the downstream link to be protected.

In the embodiments of the present disclosure, after finding that burst conflict will occur on the output port of the core router at a future moment, the core router sends a burst delay request to the upstream core router, requesting the upstream core router that has an FDL and delay capability to delay the burst. Therefore, the FDL configured in the network is brought into full play, and the probability of burst conflict is reduced.

DETAILED DESCRIPTION

The technical solution according to the present disclosure is hereinafter described in detail with reference to preferred embodiments and accompanying drawings.

Figure 1:
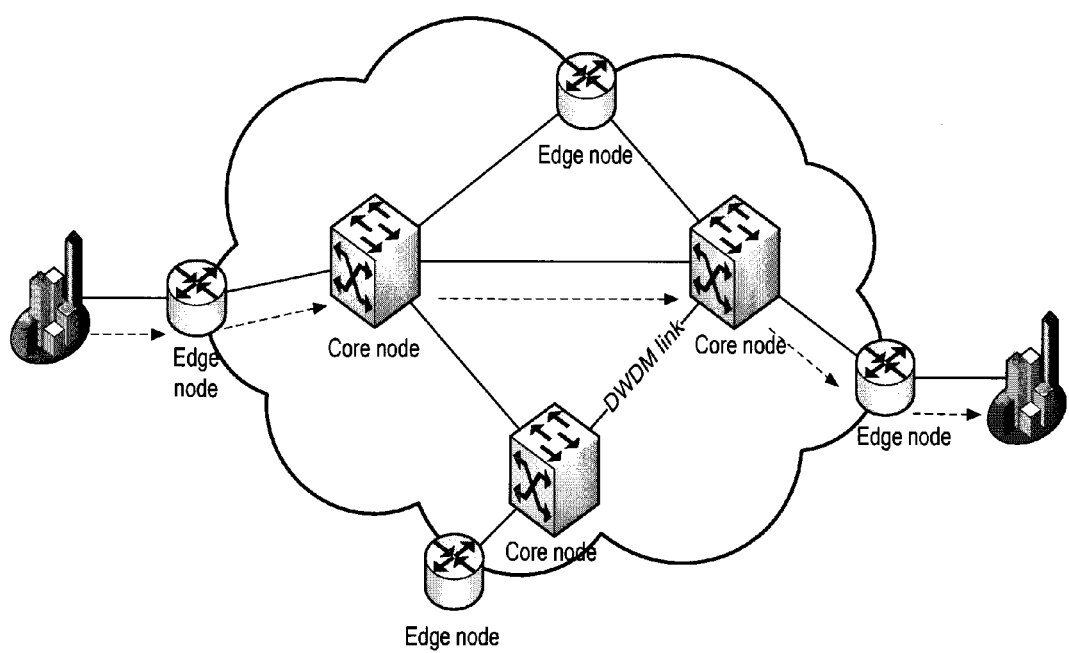
FIG. 1 shows a structure of an OBS network.
Figure 2:
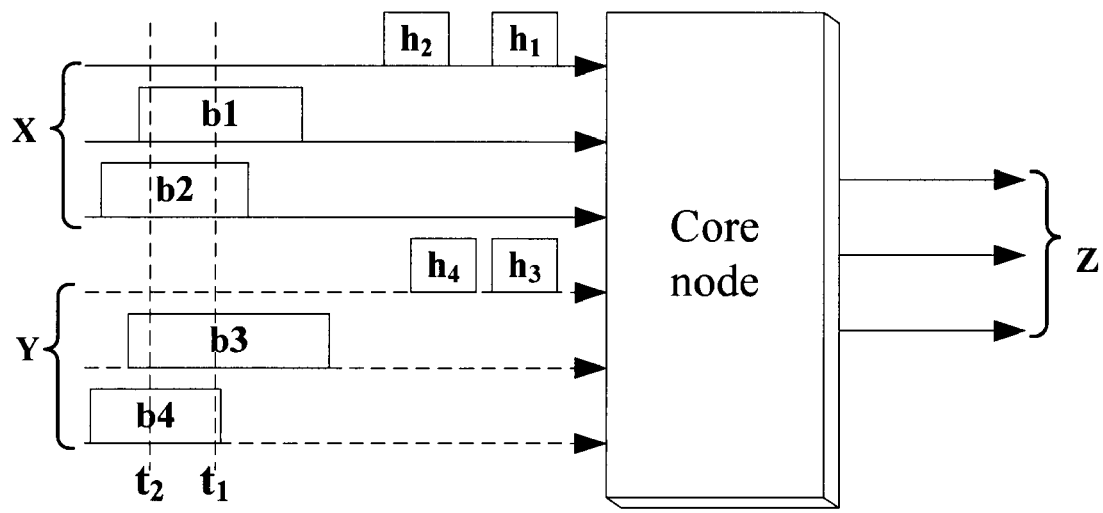
FIG. 2 shows the use of a BORA to delay a burst in the prior art.
Figure 2:
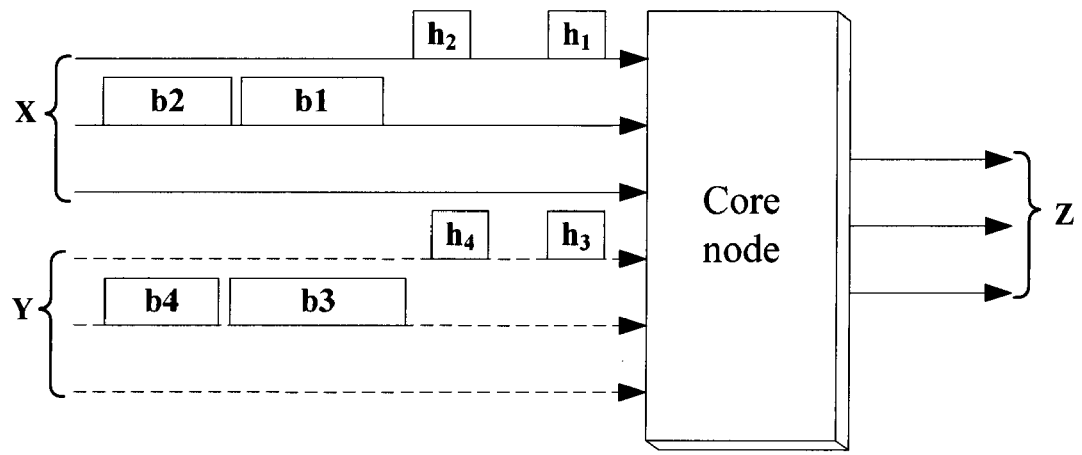
Figure 3:
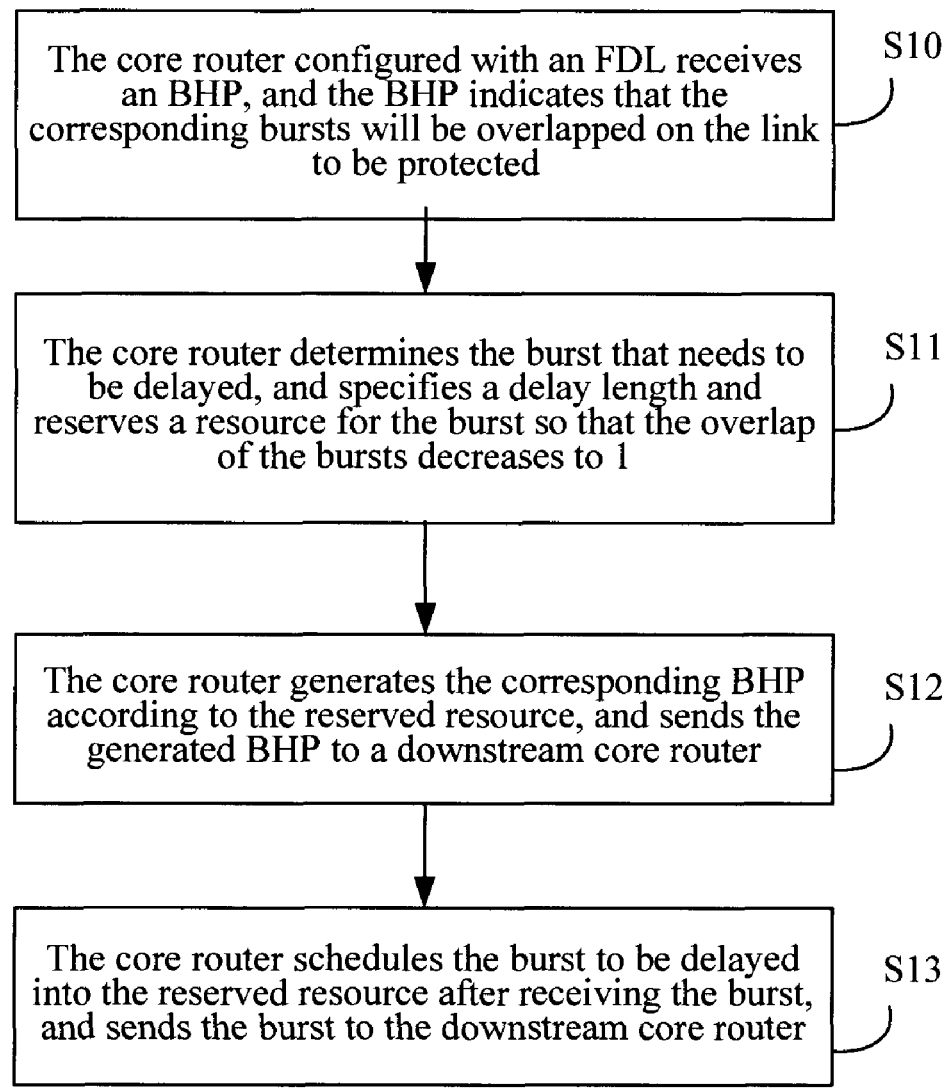
FIG. 3 is a flowchart of a first method for delaying a burst according to an embodiment of the present disclosure.

FIG. 3 is a flowchart of the first method for delaying a burst according to an embodiment of the present disclosure. The implementation process of the method is as follows:

Step S10: The BHP arrives at the core router configured with an FDL. The core router performs optical-electrical conversion for the BHP, and reads the information (such as arriving time and ending time of the burst) carried in the BHP. The information carried in the BHP shows that a burst directed to a link to be protected will be overlapped on this link of the core router at a future moment.

Step S11: The core router determines the burst that needs to be delayed according to the preset scheduling algorithm, specifies a proper delay length for the burst to be delayed, and reserves a proper resource for the burst so that the overlap of the burst decreases to 1.

The core router may either have a wavelength converter or have no wavelength converter. A core router configured with a wavelength converter may reserve resources for the burst on the wavelength of the output port whose wavelength is different from the wavelength of the input port of the burst. A core router configured with no wavelength converter can reserve resources for the burst only on the wavelength of the output port whose wavelength is the same as the wavelength of the input port of the burst.

Step S12: The core router generates an appropriate BHP according to the reserved resource, and sends the generated BHP to the downstream core router.

Step S13: The core router schedules the burst to be delayed into the reserved resource after receiving the burst, and sends the burst to the downstream core router.

In the foregoing method, the core router configured with an FDL uses the FDL to "stagger" the burst upon finding that the burst will be overlapped at a future moment. Frequent use of the FDL increases the end-to-end delay and attenuates the signals. In order to avoid the foregoing problems, the present disclosure puts forward a method for delaying a burst in the case in which an overlap threshold is set for each core router configured with an FDL for the sake of the link to be protected. Therefore, the core router configured with an FDL performs delay processing for the burst only if finding that the overlap of the burst which passes through the core router and is directed to the link to be protected is greater than the overlap threshold.

Figure 4:
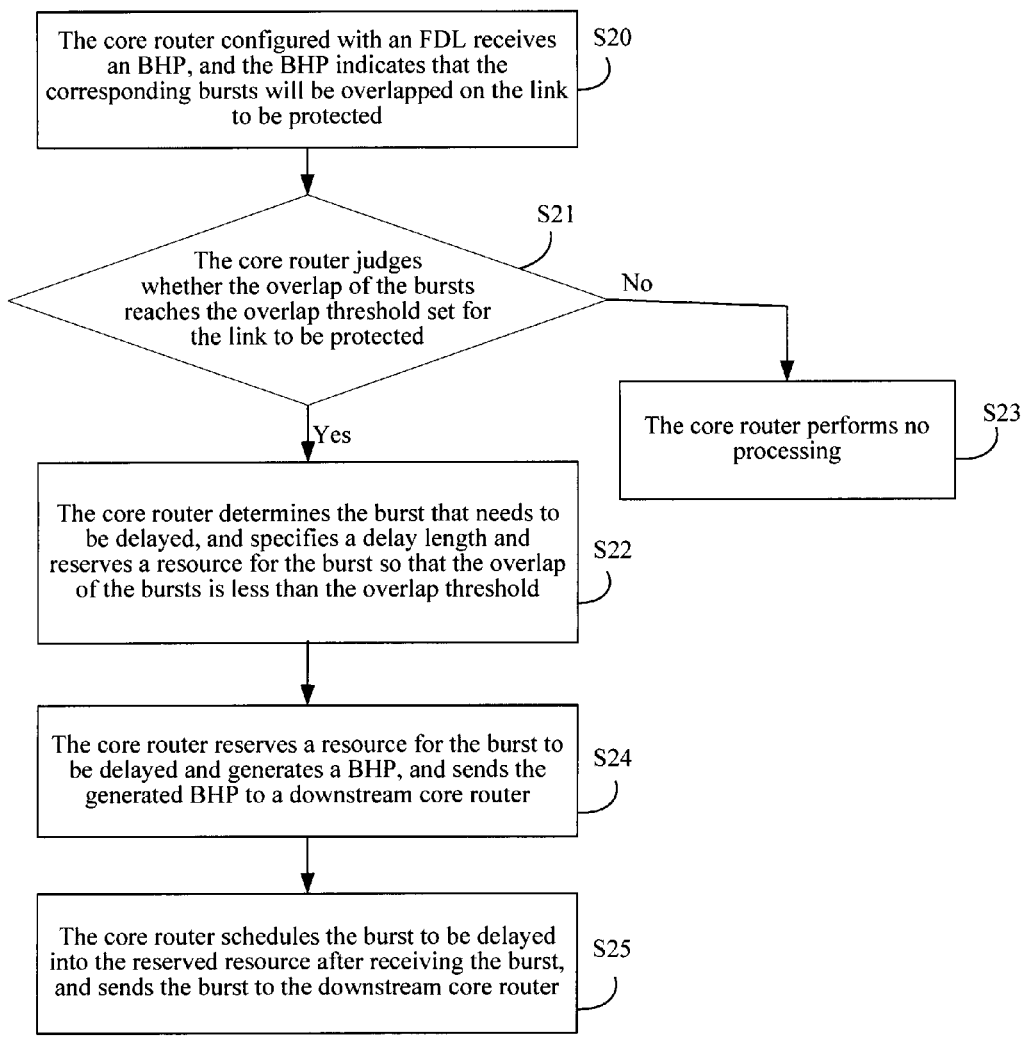
FIG. 4 is a flowchart of a second method for delaying a burst according to an embodiment of the present disclosure.

FIG. 4 is a flowchart of the second method for delaying a burst according to an embodiment of the present disclosure. The implementation process of the method is as follows:

Step S20: The BHP arrives at the core router configured with an FDL. The core router performs optical-electrical conversion for the BHP, and reads the information (such as arriving time and ending time of the burst) carried in the BHP. The information carried in the BHP shows that a burst directed to a link to be protected will be overlapped on this link of the core router at a future moment.

Step S21: The core router judges whether the overlap of the burst reaches the overlap threshold set for the link to be protected. If the overlap of the burst reaches the overlap threshold set for the link to be protected, the process proceeds to step S22; otherwise, the process proceeds to step S23.

In this embodiment, the modes of setting an overlap threshold for the core router for the sake of the link to be protected include, but are not limited to, the following two modes:

Mode 1 is a route-based mechanism of determining an overlap threshold. An overlap threshold is set for the core router for the sake of a link to be protected according to the following formula:

$$\theta_i = P_i \frac{M}{N}$$

where $\theta_i$ is an overlap threshold set for the core router i for the sake of the link to be protected; $P_i$ is the quantity of trails which pass through the core router i and the link to be protected; M is the total quantity of data channels of the link to be protected; and N is the total quantity of trails which pass through the core router configured with FDL and pass through the link to be protected.

Mode 2 is a traffic-based mechanism of determining an overlap threshold. An overlap threshold is set for the core router for the sake of a link to be protected according to the following formula:

$$\theta_i = \frac{M\rho_i}{\sum_{k=1}^{N} \rho_k}$$

where $\theta_i$ is an overlap threshold set for the core router i for the sake of the link to be protected; M is the total quantity of data channels of the link to be protected; $\rho_i$ is the traffic which passes through the core router i and the link to be protected within a time window; and $$\sum_{k=1}^{N} \rho_k$$

is the total traffic which passes through the core router configured with FDL and passes through the link to be protected within the time window. The core router i accumulates a statistical value of the traffic which passes through the core router i and the link to be protected in the current time window, and uses the statistical value as a predicted value of the traffic which passes through the core router i and the link to be protected in the next time window.

Step S11: The core router determines the burst that needs to be delayed according to the preset scheduling algorithm, specifies a proper delay length for the burst to be delayed, and reserves an appropriate resource for the burst so that the overlap of the burst is less than the overlap threshold, whereupon the process proceeds to step S24.

Step S23: The core router performs no processing.

Step S24: The core router generates an appropriate BHP according to the reserved resource, and sends the generated BHP to the downstream core router.

Step S25: The core router schedules the burst to be delayed into the reserved resource after receiving the burst, and sends the burst to the downstream core router.

Figure 5:
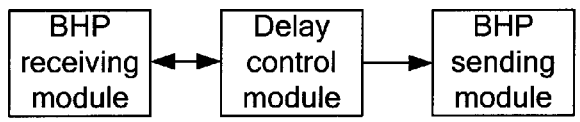
FIG. 5 shows a structure of a first core router according to an embodiment of the present disclosure.

Corresponding to the foregoing two methods for delaying the burst, a core router is further put forward in an embodiment of the present disclosure. FIG. 5 shows a structure of the first core router according to an embodiment of the present disclosure. This core router includes:

a BHP receiving module adapted to receive a BHP from an upstream router;

a delay control module adapted to: determine the burst that needs to be delayed according to the received BHP if the BHP received by the BHP receiving module indicates that bursts will be overlapped on the link to be protected, specify a proper delay length, reserve a proper resource for the burst that needs to be delayed, and generate a proper BHP;

preferably, if the BHP received by the BHP receiving module indicates that burst overlap will occur on a link to be protected, the delay control module further judges whether the overlap of the burst reaches the overlap threshold assigned to the link to be protected; if the overlap of the burst reaches the overlap threshold assigned to the link to be protected, the delay control module determines the burst to be delayed according to the received BHP, specifies a delay length for the burst, reserves a resource for the burst, and generates a BHP to make the overlap of the burst less than the overlap threshold; and a BHP sending module adapted to send the BHP generated by the delay control module to the downstream core router.

After the foregoing first method for delaying a burst is applied, the core router configured with an FDL performs proactive delay processing for the burst to be overlapped after predicting that the burst will be overlapped on the link to be protected, thus reducing the probability of burst overlap on the downstream link to be protected.

Further, after the foregoing second method for delaying a burst is applied, if predicting that the burst will be overlapped on the link to be protected, the core router configured with an FDL judges whether the overlap of the bursts is greater than the preset overlap threshold. If the overlap of the bursts is greater than the preset overlap threshold, the core router performs proactive delay processing for the burst to be overlapped. This reduces the probability of burst overlap on the downstream link to be protected, overcomes signal attenuation caused by frequent use of the FDL, and avoids increase of end-to-end delay.

Figure 6:
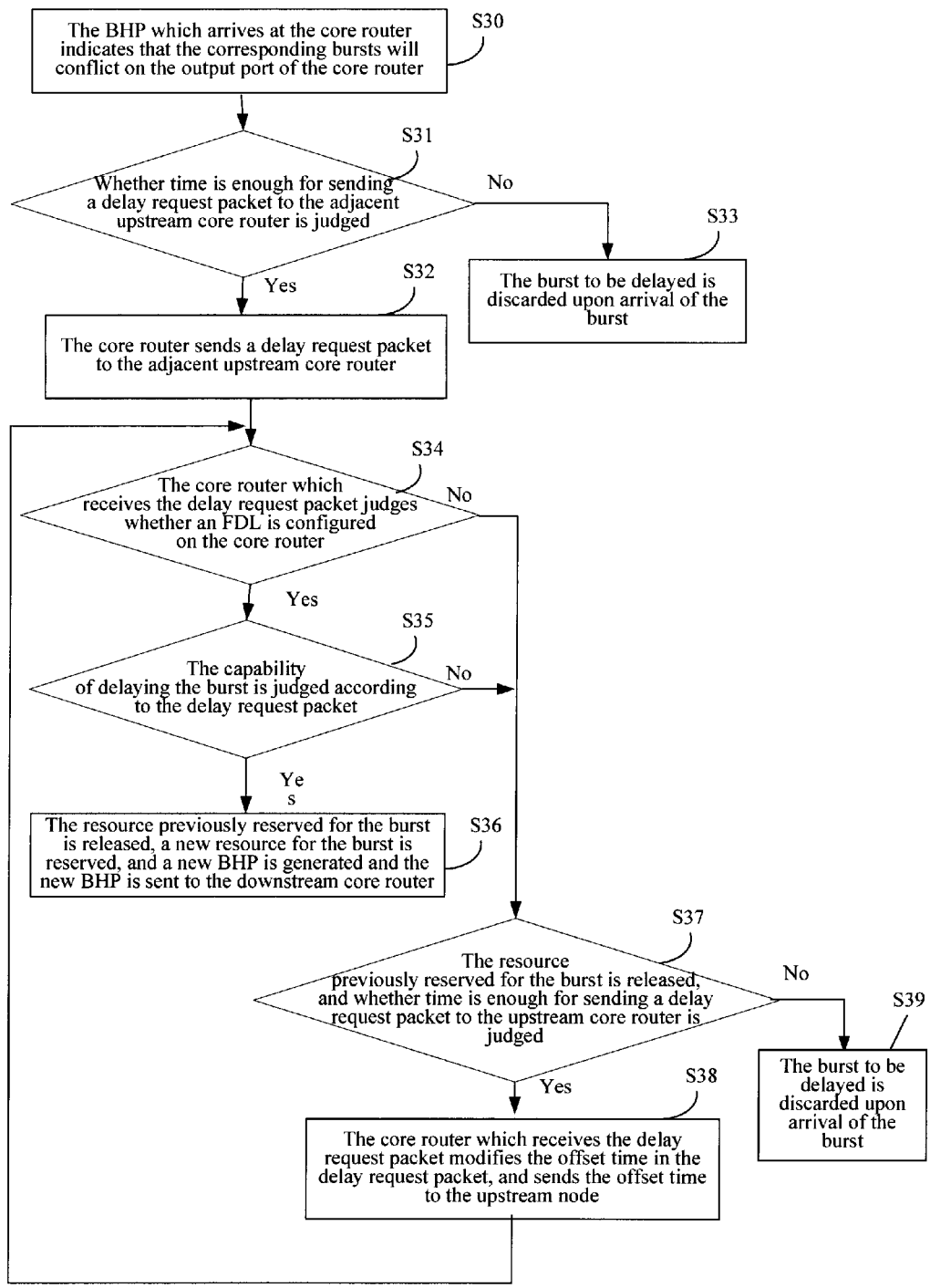
FIG. 6 is a flowchart of a third method for delaying a burst according to an embodiment of the present disclosure.

FIG. 6 is a flowchart of the third method for delaying a burst according to an embodiment of the present disclosure. The implementation process of the method is as follows:

Step S30: The BHP arrives at the core router, which is configured with an FDL or without an FDL. The core router performs optical-electrical conversion for the BHP, and reads the information (such as arriving time and ending time of the burst) carried in the BHP. The information carried in the BHP indicates that the corresponding burst will conflict on the output port of the core router at a future moment.

Step S31: The core router which has a conflict between bursts determines the burst to be delayed and a proper delay length according to the preset scheduling algorithm, and judges whether there is enough time to send a delay request packet to the adjacent upstream core router according to the BHP corresponding to the burst to be delayed. If there is enough time, the process proceeds to step S32; otherwise, the process proceeds to step S33.

If the offset time "T" carried in the BHP received by the current core router satisfies the following formula, the current core router determines that there is enough time to send a delay request packet to the upstream core router.

$$T > \frac{L}{V} + t_{pro},$$

where T is the offset time carried in the BHP or delay request packet received by the current core router; L is the distance between the current core router and the upstream core router; V is the rate of sending the delay request; and $t_{pro}$ is the time required for the upstream core router to receive a delay request, reserve a new resource for the burst to be delayed, and generate a proper BHP.

Step S32: The core router which has an overlap between bursts sends a delay request packet to the adjacent upstream core router. The packet carries a delay length specified for the burst to be delayed and an offset time field. The offset time field represents the time of offset from the corresponding burst when the delay request packet arrives at the previous core router. Afterward, the process proceeds to S34.

Step S33: The core router which has an overlap between bursts discards the burst to be delayed upon arrival of this burst.

Step S34: The core router which receives the delay request packet judges whether an FDL is configured for the core router. If an FDL is configured for the core router, the process proceeds to step S35; otherwise, the process proceeds to step S37.

Step S35: The core router which receives the delay request packet judges whether the core router is capable of delaying the burst according to the delay length field in the delay request packet. If the core router is capable, the process proceeds to step S36; otherwise, the process proceeds to step S37.

Step S36: The core router that receives the delay request packet releases the resource previously reserved for the burst, reserves a new resource for the burst, and generates a new BHP and sends the new BHP to the downstream core router.

Step S37: The core router that receives the delay request packet releases the resource previously reserved for the burst, and judges whether there is enough time to send a delay request packet to its adjacent upstream core router according to the offset time field carried in the delay request packet. If there is enough time, the process proceeds to step S38; otherwise, the process proceeds to step S39.

If the offset time "T" carried in the delay request packet received by the core router satisfies the following formula, the core router that receives the delay request packet determines that there is enough time to send the delay request packet to its adjacent upstream core router:

$$T > \frac{L}{V} + t_{pro},$$

where T is the offset time carried in the delay request packet received by the core router; L is the distance between the current core router and its adjacent upstream core router; V is the rate of sending the delay request; and $t_{pro}$ is the time required for its adjacent upstream core router to receive a delay request, reserve a new resource for the burst to be delayed, and generate a proper BHP.

Step S38: The core router that receives the delay request packet modifies the offset time field in the delay request packet, and sends the modified delay request packet to its adjacent upstream core router, where the offset time field represents the time of offset from the corresponding burst when the delay request packet arrives at its adjacent upstream core router. Afterward, the process returns to step S34.

Step S39: The core router which receives the delay request packet discards the burst to be delayed upon arrival of this burst.

Corresponding to the foregoing third method for delaying the burst, two types of core routers are put forward in an embodiment of the present disclosure.

Figure 7:
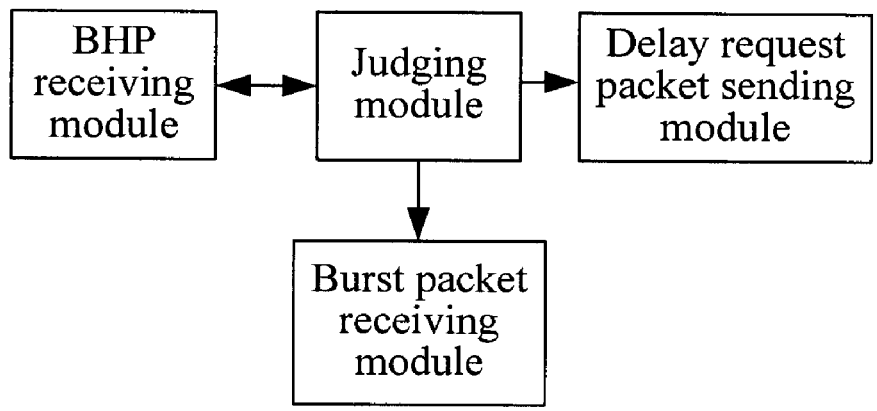
FIG. 7 shows a structure of a second core router according to an embodiment of the present disclosure.

FIG. 7 shows a structure of the second core router according to an embodiment of the present disclosure. This core router includes:

a BHP receiving module adapted to receive a BHP;

a burst receiving module adapted to receive a burst from an upstream router;

a delay request packet sending module adapted to send a delay request packet to the upstream core router; and a judging module adapted to: judge whether it is necessary to send the delay request packet to the upstream core router if the BHP received by the BHP receiving module indicates that the corresponding bursts will conflict on the output port. If it is necessary to send the delay request packet to the upstream core router, the judging module triggers the delay request sending module to send the delay request packet to the upstream core router, or else control the burst receiving module to discard the burst upon receiving the burst.

Figure 8:
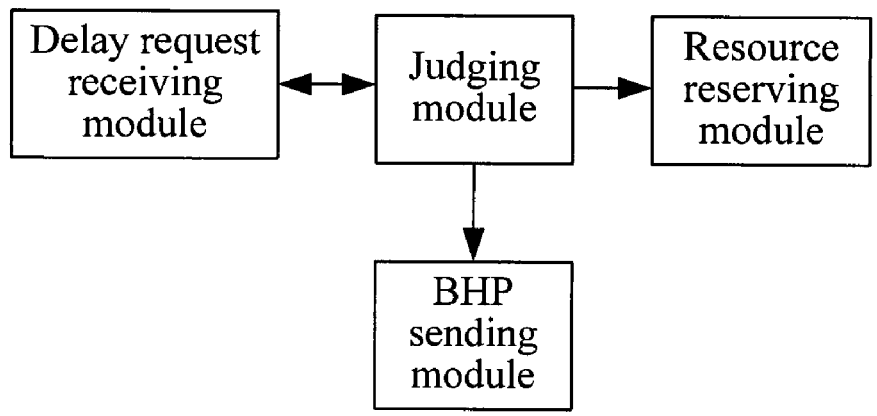
FIG. 8 shows a structure of a third core router according to an embodiment of the present disclosure.

FIG. 8 shows a structure of the third core router in an embodiment of the present disclosure. This core router includes:

a BHP sending module adapted to send a BHP;

a delay request receiving module adapted to receive a delay request packet from the downstream core router;

a resource reserving module adapted to reserve a proper resource for the burst; and a judging module adapted to: judge whether the burst can be delayed according to the delay request packet received by the delay request receiving module. If the burst can be delayed according to the delay request packet received by the delay request receiving module, the judging module triggers the resource reserving module to release the resource previously reserved for the burst, reserve a new resource for the burst, and generate a new BHP which is sent by the BHP sending module to the downstream core router; otherwise, release the resource previously reserved for the burst.

Through the third embodiment of the present disclosure, after finding that burst conflict will occur on the output port of the core router at a future moment, the core router sends a burst delay request to the upstream core router, requesting the upstream core router that has an FDL and delay capability to delay the burst. Therefore, the FDL configured in the network is brought into full play, and the probability of burst conflict is reduced.

It is apparent that those skilled in the art can make various modifications and variations to the present disclosure without departing from the spirit and scope of the present disclosure. The present disclosure is intended to cover such modifications and variations provided that they fall in the scope of protection defined by the following claims or their equivalents.

What is claimed is:

1. A method for delaying a burst, comprising:

judging, by a core router, whether an overlap of bursts reaches an overlap threshold set for a link to be protected if a Burst Header Packet (BHP) received by the core router indicates that the bursts directed to the link to be protected will be overlapped on the link;

if the overlap of the bursts reaches the overlap threshold set for the link to be protected, determining the burst to be delayed, specifying a proper delay length for the burst to be delayed, and reserving the resource for the burst to be delayed;

if the overlap of the bursts does not reach the overlap threshold set for the link to be protected, performing no delay processing for the burst;

generating a corresponding BHP according to the reserved resource;

sending the generated BHP to a downstream core router; and sending the burst to be delayed to the downstream core router by scheduling the reserved resource after receiving the burst.

2. The method of claim 1, further including:
setting, by the core router, the overlap threshold for the link to be protected according to the following formula:

$$\theta_i = P_i \frac{M}{N}$$

wherein $\theta_i$ is the overlap threshold set for the core router for the sake of the link to be protected, $P_i$ is a quantity of trails which pass through the core router and the link to be protected, M is a total quantity of data channels of the link to be protected, and N is a total quantity of trails which pass through the core router and the link to be protected.

3. The method of claim 1, further including:
setting, by the core router, the overlap threshold for the link to be protected according to the following formula:

$$\theta_i = \frac{M\rho_i}{\sum_{k=1}^{N} \rho_k}$$

where $\theta_i$ is the overlap threshold set for core router for the sake of the link to be protected, M is a total quantity of data channels of the link to be protected, $\rho_i$ is a predicted value of traffic which passes through the core router and the link to be protected within a time window, and $$\sum_{k=1}^{N} \rho_k$$

is a predicted value of total traffic which passes through the core router and the link to be protected within the time window.

4. The method of claim 3, further including:
generating, by the core router, a statistical value of the traffic which passes through the core router and the link to be protected in a current time window; and
using the statistical value as a predicted value of the traffic which passes through the core router and the link to be protected in a next time window.

5. The method according to claim 1, wherein the core router is configured with a Fiber Delay Line (FDL).

6. A core router, comprising:
a Burst Header Packet (BHP) receiving module configured to receive a BHP;
a delay control module configured to judge whether an overlap of the bursts reaches an overlap threshold assigned to a link to be protected if the BHP received by the BHP receiving module indicates that bursts will be overlapped on a link to be protected;
the delay control module further configured to: if the overlap of the burst reaches an overlap threshold assigned to the link to be protected, determine the burst to be delayed according to the received BHP, specify a proper delay length for a burst to be delayed, reserve a proper resource for the burst to be delayed, and generate a proper BHP; and
a BHP sending module configured to send the BHP generated by the delay control module to a downstream core router.

7. A method for delaying a burst, comprising:
(a) determining, by a core router, a burst that needs to be delayed and a delay length after receiving a Burst Header Packet (BHP) which indicates that corresponding bursts will conflict on an output port of the core router;
(b) sending, if the core router is able to send the delay request packet to an upstream core router, a delay request packet to an upstream core router according to the delay length; and
(c) releasing, by the core router that receives the delay request packet, a resource previously reserved for the burst if the burst can be delayed according to the delay request packet; reserving a new resource for the burst; and generating a new BHP and sending the new BHP to the downstream core router;
(d) if the core router that receives the delay request packet is unable to delay the burst according to the delay request packet,
releasing, by the core router that receives the delay request packet, the resource previously reserved for the burst;
sending the delay request packet to the upstream core router according to the delay length when the core router, which receives the delay request packet, is able to send the delay request packet to its upstream core router; and
proceeding to step (c).

8. The method of claim 7, wherein:
the delay request packet carries an offset time field, and the offset time field represents time of offset from the corresponding burst when the delay request packet arrives at the adjacent upstream core router.

9. The method of claim 8, the method further comprising:
determining, by the current core router, that there is enough time for sending the delay request packet to the upstream core router, if the offset time "T" carried in the BHP or the delay request packet received by a current core router satisfies the following formula:

$$T > \frac{L}{V} + t_{pro}$$

where T is the offset time carried in the BHP or the delay request packet received by the current core router; L is a distance between the current core router and the upstream core router; V is a rate of sending a delay request; and $t_{pro}$ is the time required for the upstream core router to receive the delay request, reserve the new resource for the burst to be delayed, and generate a BHP.

10. The method of claim 7, wherein step (c) further comprises:
(c1) judging, by the core router which receives the delay request packet, whether a Fiber Delay Line (FDL) is configured for the core router,
if an FDL is configured for the core router, the process proceeds to step (c2), and
if no FDL is configured for the core router, the process proceeds to step (c3);
(c2) judging whether the core router is able to delay the burst according to a delay length field in the delay request packet;
if the core router is able to delay the burst according to the delay length field in the delay request packet, releasing the resource previously reserved for the burst,
reserving the new resource for the burst,
generating a new BHP, and
sending the new BHP to the downstream core router;
if the core router is unable to delay the burst according to the delay length field in the delay request packet, the process proceeds to step (c3); and (c3) releasing the resource previously reserved for the burst, and sending the delay request packet to the upstream core router according to the delay length if it is determined that the core router is able to send the delay request packet to the upstream core router, and proceeding to step (c1).

* * * * *